United States Patent

Håland et al.

[11] Patent Number: 6,109,692
[45] Date of Patent: Aug. 29, 2000

[54] VEHICLE SEAT

[75] Inventors: Yngve Håland, Falsterbo; Ola Boström, Alingsäs, both of Sweden

[73] Assignee: Autoliv Development AB, Vårgårda, Sweden

[21] Appl. No.: 09/155,095

[22] PCT Filed: Mar. 19, 1997

[86] PCT No.: PCT/SE97/00453

§ 371 Date: Feb. 3, 1999

§ 102(e) Date: Feb. 3, 1999

[87] PCT Pub. No.: WO97/34777

PCT Pub. Date: Sep. 25, 1997

[30] Foreign Application Priority Data

Mar. 19, 1996 [GB] United Kingdom .................. 9605711

[51] Int. Cl.$^7$ .................. B60N 2/42; B60R 21/00

[52] U.S. Cl. .................. 297/216.18; 297/216.13; 297/216.19; 297/216.14

[58] Field of Search .................. 297/216.1, 216.12, 297/216.13, 216.14, 216.18, 216.19, 354.1

[56] References Cited

U.S. PATENT DOCUMENTS

| | | | |
|---|---|---|---|
| 3,357,736 | 12/1967 | McCarthy | 297/216.19 X |
| 3,802,737 | 4/1974 | Mertens . | |
| 5,366,268 | 11/1994 | Miller et al. | 297/216.13 X |

FOREIGN PATENT DOCUMENTS

| | | |
|---|---|---|
| 0556884A2 | 8/1993 | European Pat. Off. . |
| 0709249A2 | 5/1996 | European Pat. Off. . |
| 95/11818 | 5/1995 | WIPO . |

*Primary Examiner*—Anthony D. Barfield
*Attorney, Agent, or Firm*—Venable; George H. Spencer; Robert Kinberg

[57] ABSTRACT

A seat includes a squab and a back connected to the squab. At least a substantial part of the back of the seat is arranged to undergo a rearward movement relative to an initial position of the squab of the seat. The movement comprises at least one of a pivoting movement, a sliding movement, and a bending movement. A force limiter presents a first, relatively low level resisting force to the rearward movement, at a first predetermined amount of the movement, and a second, relatively high level resisting force at a second predetermined amount of the movement.

13 Claims, 6 Drawing Sheets

VEHICLE SEAT

FIELD OF THE INVENTION

The present invention relates to a vehicle seat and more particularly, relates to a vehicle seat intended for use in a motor vehicle such as a motor car.

BACKGROUND OF THE INVENTION

It has been appreciated that if a motor vehicle, such as a motor car, is involved in a rear-end collision—that is to say if a following vehicle runs into the back of the car—the occupants of the struck car often suffer from neck injuries.

It is to be understood that during a rear-end collision of this type, the vehicle that is struck is subjected to a forward acceleration. This imparts a forward acceleration to the seats of the vehicle. The squab and the back of each occupied seat engage the posterior and torso of the occupant of the seat and impart a substantial acceleration to the posterior and torso of the occupant. However, no corresponding acceleration is immediately imparted to the head of the occupant. The head is a part of the body that has substantial mass, and consequently the head has substantial inertia.

Thus, whilst the posterior and torso of the occupant of the vehicle are accelerated forwardly as a result of the rear-end collision, the head of the occupant of the vehicle initially remains stationary. This causes the neck initially to adopt a "S"-shaped configuration as the lower part of the neck moves forwardly, whilst remaining vertical, and the upper part of the neck remains in its initial position. Subsequently, the head begins to rotate, and the neck then occupies a curved configuration. The head subsequently moves forwardly. Research has shown that "whiplash" injuries may occur when the neck adopts the "S"-shaped configuration, if the head is moving, relative to the torso, at a substantial speed.

SUMMARY OF THE INVENTION

The present invention seeks to provide an improved vehicle seat in which the risk of "whiplash" injuries occurring to the occupant of the seat during a rear-end collision are reduced.

According to this invention there is provided a vehicle seat, the vehicle seat comprising a squab and a back, at least a substantial part of the back of the seat being adapted to move rearwardly, relative to the initial position of the squab of the seat, force limiter means being provided to provide a resisting force which resists said movement, the force limiter means being adapted to provide a resisting force to the said movement at a first relatively low level for a first predetermined amount of movement, and at a second, relatively high level, for a second predetermined amount of movement.

Preferably stop means are provided to terminate said movement after a specified extent of movement has been effected.

Preferably a catch is provided adapted to prevent the said part of the back of the seat from moving rearwardly, the catch being adapted to be released in response to a sensed rear impact.

In one embodiment the said part of the back of the seat is adapted to effect said rearward movement with a pivoting action relative to the squab of the seat.

Alternatively the said part of the back of the seat is adapted to effect said rearward movement with a sliding action relative to the squab of the seat.

In one embodiment said part of the back of the seat is adapted to effect said rearward movement with a pivoting action and a sliding action relative to said squab.

In certain embodiments the entire back of the seat is adapted to more relative to the squab of the seat.

In an alternative embodiment only part of the back of the seat executes said rearward movement against said relatively low resisting force, while another part of the back of the seat which incorporates a head-rest remains substantially still, and both of said parts of the back of the seat execute said rearward movement against said relatively high resisting force.

Conveniently the first predetermined amount of movement causes a movement, measured at the top of the back of the seat, through a distance in the range of 150–250 mm.

Advantageously the second predetermined amount of movement causes a movement, measured at the top of the back of the seat, of less than 80 mm.

Preferably said first relatively low level resisting force will be overcome by a force of less than 2,000 Newtons applied to the centre of the back of the seat.

Conveniently said second relatively high level resisting force will be overcome only by a force in excess of 5,000 Newtons, or even 10,000 Newtons, applied to the centre of the back of the seat.

In order that the invention may be more readily understood, and so that further features thereof may be appreciated, the invention will now be described, by way of example, with references to the accompanying drawings in which:

Referring initially to FIG. 1 of the accompanying drawings, illustration A shows the position of the head 1 and neck 2 of the occupant of a motor vehicle during ordinary conditions. The head and neck would occupy this position if, for example, the vehicle were stationary.

DETAILED DESCRIPTION OF THE DRAWINGS

Assuming that the vehicle was then subjected to a rear impact, the posterior and torso of the occupant of the vehicle would be moved forwardly, as a consequence of the forward movement of the vehicle and the forward movement of the seat mounted in the vehicle. The head 1 of the occupant would tend to remain stationary, because of its inertia. The neck 2 of the occupant would then have the condition shown in illustration B. The neck here has a "S" configuration. Subsequently, as shown in illustration 1 the head 1 moves rearwardly, thus giving the neck 2 an arcuate configuration and, if the head does not impinge on the head-rest, the head can move rotationally to the tilted back position shown in illustration 1D where the neck 2 is bent back (hyperextension) with a very significant degree of curvature.

It is believed that if the neck is subject to the distortions shown in illustrations 1A to 1D, the hydrodynamic pressure of the fluid within the spine can rise suddenly, when the neck adopts the "S"-shaped configuration, thus imparting pressure shocks to parts of the central nervous system in contact with that fluid. Also, injuries may well be imparted to the ganglia. It is believed that this is why patients with so-called "whiplash" injuries may suffer from the effects of those injuries for a long time. Even though a typical rear impact collision occurs with a relatively low impact speed, these collisions are responsible for a large number of relatively serious injuries each year.

Figure 1A:
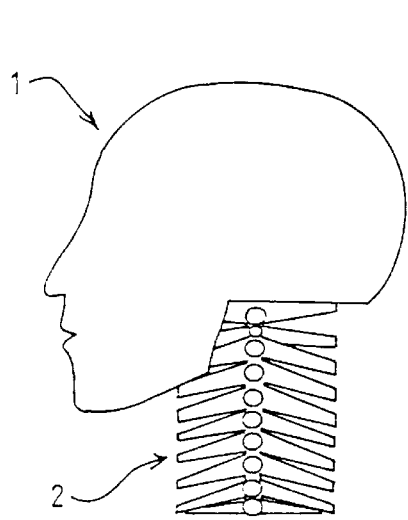
FIGS. 1a–1d is a diagrammatic view comprising four illustrations showing the condition of the head and neck of an occupant of a vehicle in a rear collision situation where a conventional seat is used.
Figure 1B:
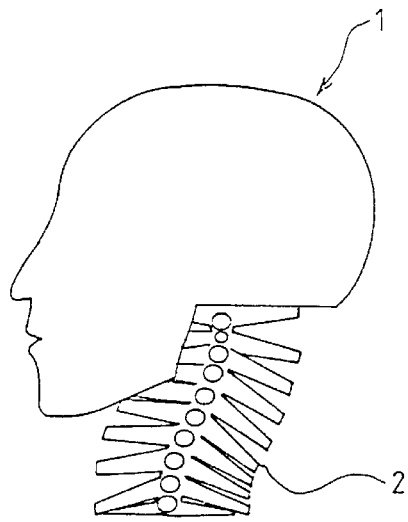
Figure 1C:
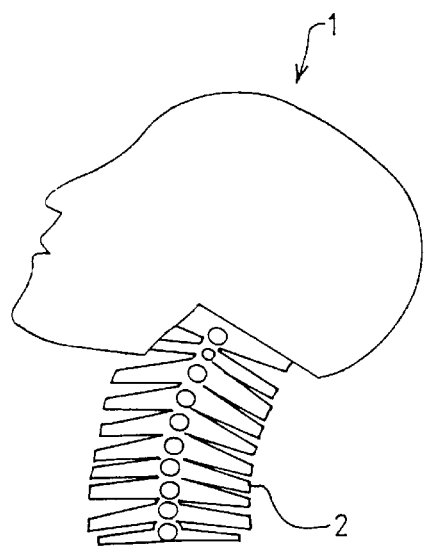
Figure 1D:
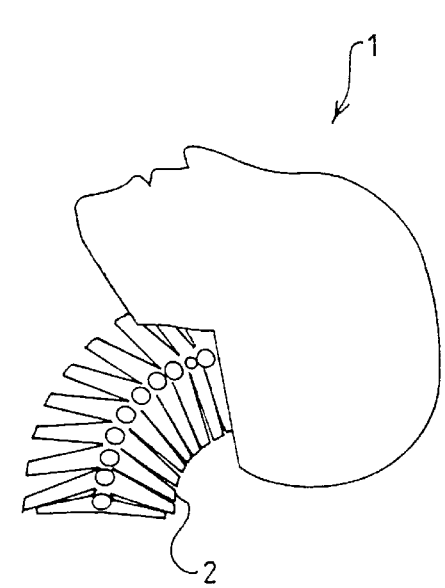
Figure 2:
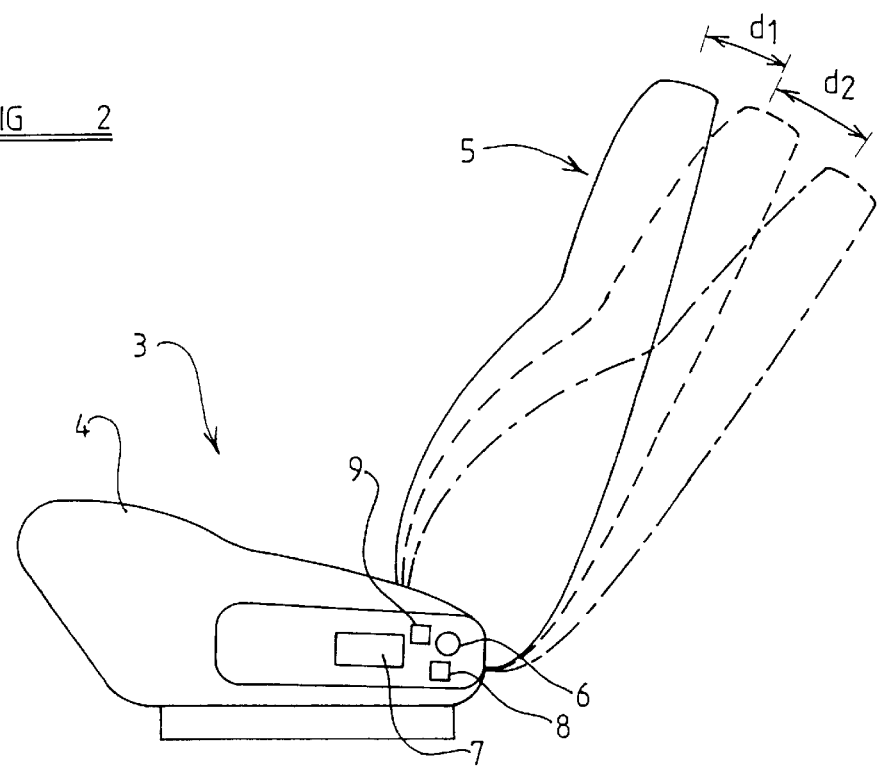
FIG. 2 is a diagrammatic view of a seat in accordance with the invention illustrating, in phantom, different positions for part of the seat.

FIG. 2 illustrates a simple embodiment of the invention. In the embodiment of FIG. 2, a seat 3 is provided comprising a squab 4 and a back 5. The back 5 is connected to the squab by means of a pivotal connection 6 so that the back of the seat may tilt rearwardly. The back numeral 5 of the seat is associated with a force limiter 7. Various types of force limiter will be described in detail below. The force limiter 7 is adapted to permit the seat back to tilt rearwardly through a first distance d1 with a first predetermined limiting force and subsequently, to pivot rearwardly through a second distance d2 with a greater resistive force. The distance d1 may be in the range of 150–250 mm and distance d2 may typically be less than 80 mm as measured at the top of the back of the seat, but may be greater than 80 mm. A stop 8 is provided in the illustrated embodiment to prevent further rearward movement of the back of the seat. The stop 8 may comprise any element or component that terminates the rearward movement of the back of the seat, and may comprise part of the vehicle in which the seat is mounted. Optionally, a catch 9 may be provided which serves to retain the back of the seat in its original position, the catch 9 being released when a rear impact is sensed.

Figure 3:
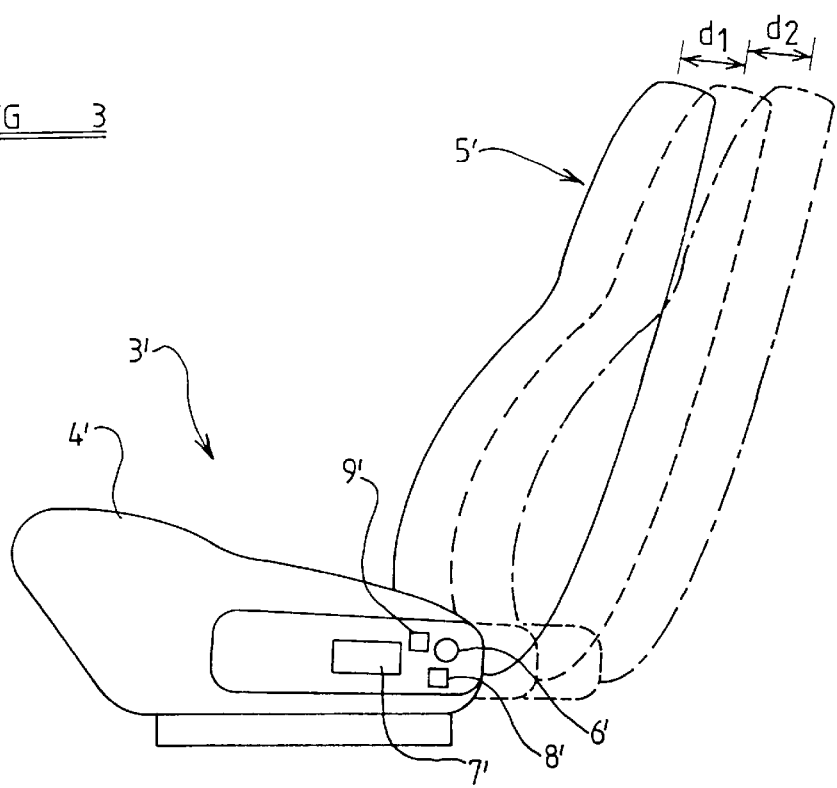
FIG. 3 is a view corresponding to FIG. 2 showing a different seat.

FIG. 3 illustrates an alternative form of seat 3' which is similar to that shown in FIG. 2. The seat 3' has a squab 4' and a back 5'. The back 5' is connected to the squab by means of a pivotal connection 6' and also by means of a slide arrangement which permits the back of the seat to move rearwardly. The pivotal connection 6' is provided with a recliner mechanism so that, in ordinary use, the angle of inclination of the back of the seat may be adjusted. Thus, the back of the seat may tilt about the pivotal connection 6' or may slide rearwardly, without any tilting, on the slide arrangement. A force limiter 7' is provided associated with the slide arrangement. Various types of force limiter will be described in detail below.

The force limiter 7' is adapted to permit the back of the seat to move rearwardly through a first distance d1 with a predetermined resistive force and subsequently, to move rearwardly through a second distance d2 with a greater resistive force. The distance d1 may be in the range of 150–250 mm and the distance d2 may typically be less than 80 mm, although the distance d2 may exceed 80 mm. A stop 8' and a catch 9' are provided in the described embodiment, similar to those provided in the embodiment of FIG. 2.

In the embodiment of FIG. 2 the seat back executes a rearward pivoting movement against a low resisting force and then against a higher resisting force. In the embodiment of FIG. 3, the seat back executes a rearward sliding movement against a low resisting force and then against a higher resisting force, but in alternative embodiments the seat back may, for example, execute a rearward sliding movement against a first low resisting force, and then execute a rearward pivoting or bending movement against a higher resisting force. The first and second movement may be resisted by a single force limiter, or by force limiter means that comprise two components.

Figure 4:
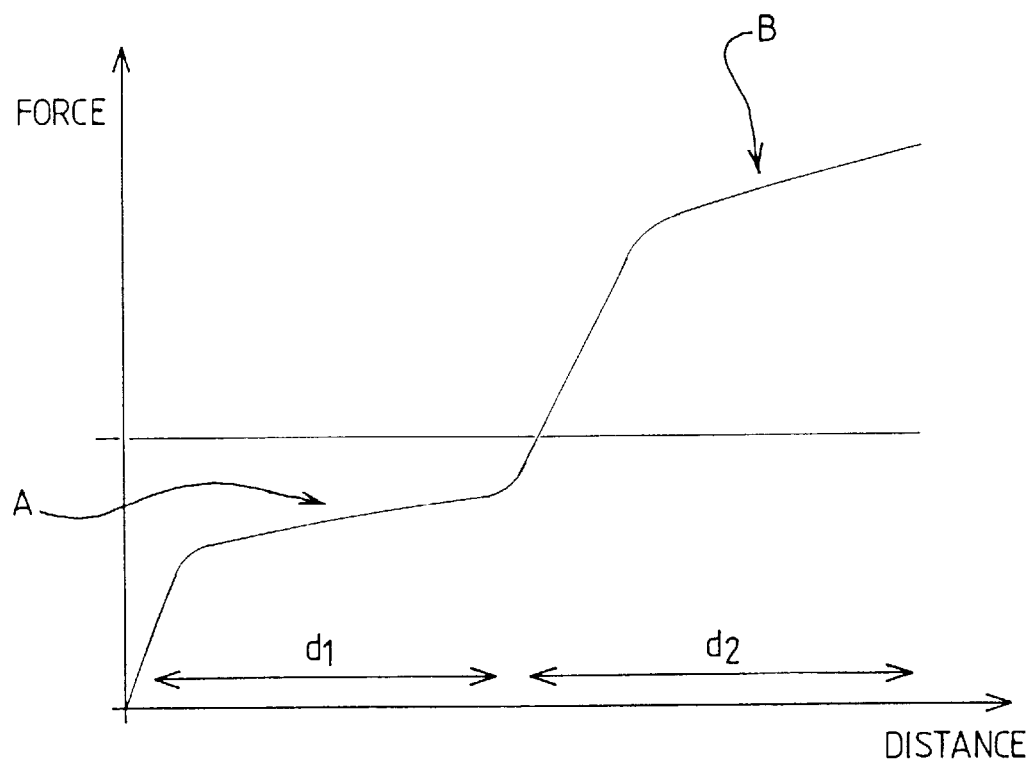
FIG. 4 is a graphical view illustrating the force necessary to move the part of the seat against the degree of movement of that part of the seat.

FIG. 4 is a graphical figure illustrating force plotted against distance. The graph is not to scale. It is to be observed that during an initial movement of the back of the seat, the force limiter provides a resistive force, as shown in region A of the graph which is relatively low. This force may be less than 2,000 Newtons measured at the centre of the back of the seat. Thus a force of up to 2,000 Newtons must be applied to the centre of the back of the seat to cause the seat back to move. Typically, the force is over 5,000 Newtons. The force is not uniform during initial movement of the seat, but the force is within a predetermined "band" which is set at a relatively low level. The part of the graph 8 corresponds to movement of the back of the seat through the initial distance d1. The subsequent part of the graph identified by the reference letter B corresponds to movement through the second distance d2. In this part of the movement of the back of the seat the resistive force provided by the force limiter is much higher than during the first part of the movement. The force may be in excess of 5,000 Newtons, or even in excess of 10,000 Newtons measured at the centre of the back of the seat. Thus, a force of more than 5,000 or 10,000 Newtons must be applied to the centre of the back of the seat to cause the seat back to move. Thus, in this second part of the movement, corresponding to the distance d2, the resistive force provided by the force limiter is within a band which is higher than the corresponding band during the initial movement of the back of the seat, corresponding to the distance d1.

Figure 5:
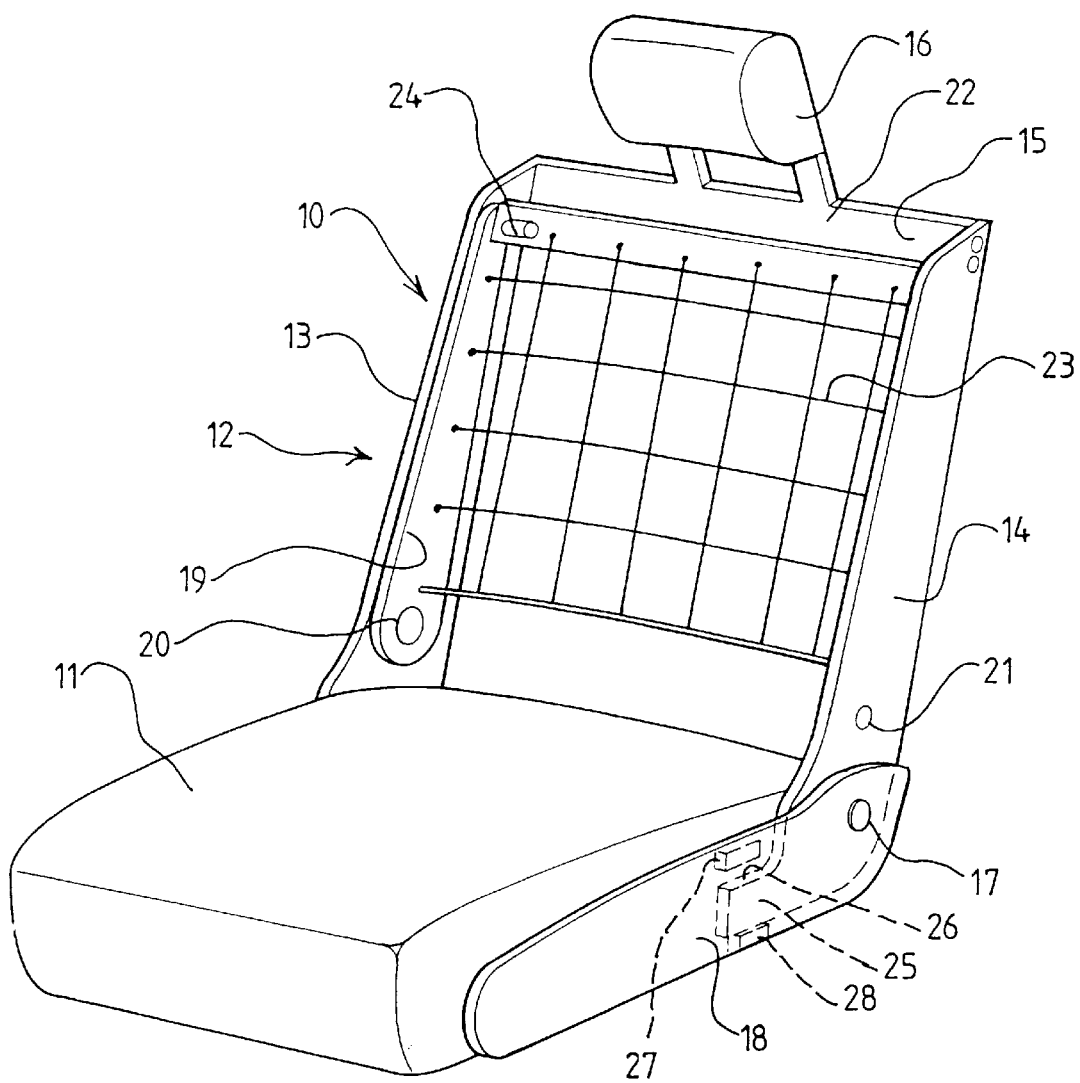
FIG. 5 is a diagrammatic view, with parts cut away, of another seat in accordance with the invention.

Referring now to FIG. 5 of the accompanying drawings, a further seat 10 in accordance with the invention is illustrated. The seat 10 comprises a squab 11 and a back assembly. The padding and upholstery that would ordinarily cover the back assembly has been omitted for the sake of clarity of illustration.

The back assembly comprises a main or outer frame 12 consisting of two side elements 13,14 which are interconnected by a transversely extending upper frame member 15. The upper frame member 15 carriers a head-rest 16. The provision of such a head-rest is optional. The main frame 12 is pivotally connected by means of pivots 17 to side supports 18 that are formed integrally with the squab 11 of the seat.

An inner frame is provided, comprising two side elements, only one of which, 19, is visible in FIG. 5. The inner frame is snugly received within the main frame 12. The side elements of the inner frame are pivotally connected to the side elements 13,14 of the main frame 12 by means of pivotal connections 20,21. The two side elements of the inner frame are inter-connected by a transverse upper frame member 22, and a wire mesh 23 is provided which fills the inner frame.

The inner frame is held in the initial position illustrated by means of at least one force limiter 24 which is illustrated schematically. Force limiters that are suitable for use in embodiments of the invention are described below. The force limiter serve to absorb force as the components of the seat move in a rear-impact situation.

The lower part of each of the side elements 13,14 of the main frame are provided with horizontal forwardly extending portions 25 which define upper engagement faces 26. The side elements 18 connected to the squab may each carry a stop element 27 located above an abutment face 26. A force limiter 28, which is also shown schematically in this figure, is associated with the side elements 13 and 14 of the main frame 12.

Figure 6:
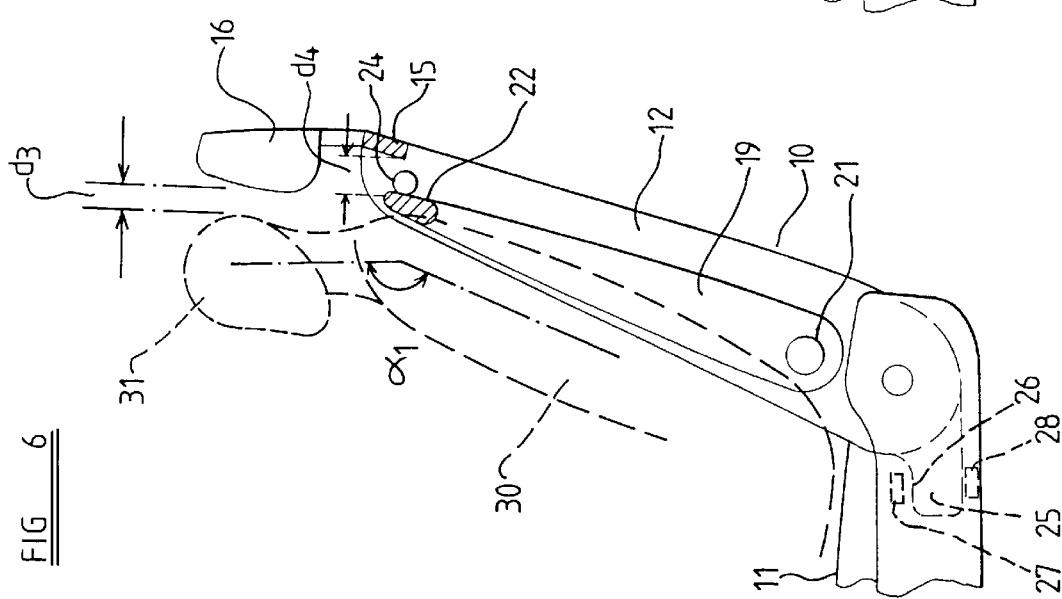
FIG. 6 is a side view of the seat of FIG. 5 in an initial condition.
Figure 7:
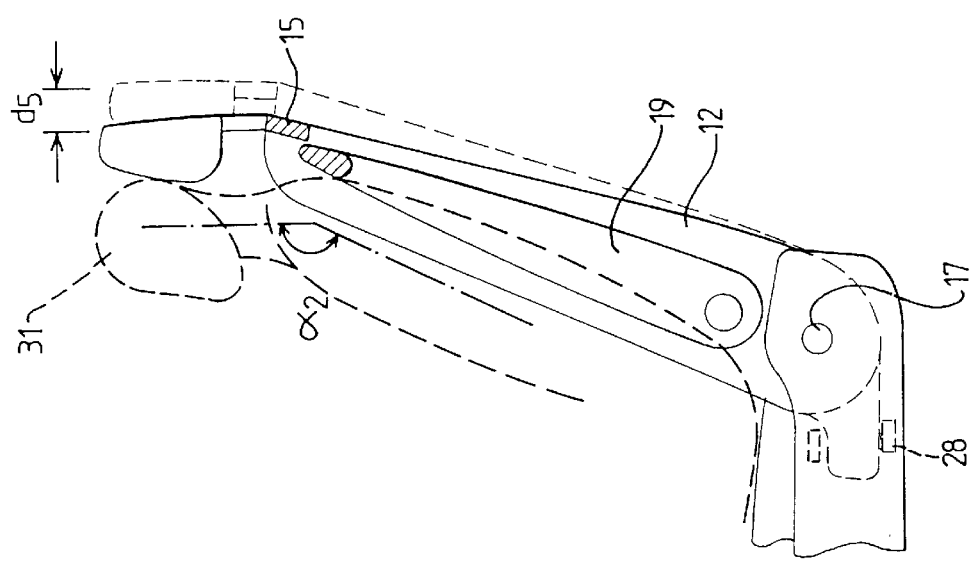
FIG. 7 is a side view corresponding to FIG. 6 showing the seat in an intermediate condition during a rear impact, illustrating a final position of the seat in phantom.
Figure 8:
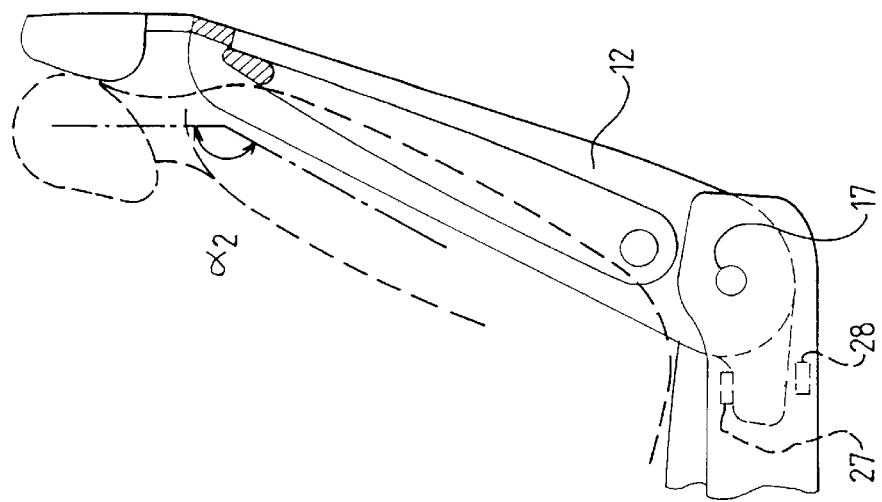
FIG. 8 is a view corresponding to FIG. 7 showing the first position of the seat.

Referring now to FIGS. 6 to 8 of the accompanying drawing, the seat of FIG. 5 is illustrated when occupied by, for example, a driver 30 of a vehicle, showing the positions that the seat and driver will occupy at successive instants during a rear impact.

Initially the driver 30 is present on the seat, with the driver being supported by the squab 11 and the back assembly of the seat. The posterior of the driver rests on the squab 11 and the torso of the driver is supported by the back assembly of the seat. The head 31 of the driver is spaced forwardly in front of the head-rest 16 by a distance d3.

It is to be observed that the neck of the driver makes an angle α1 with the main torso of the driver.

The upper frame member 22 of the inner frame is spaced from the upper frame member 15 of the main frame 12 by a distance d4. Typically, the distance d4 is selected to be approximately 50 mm.

When a rear impact occurs the entire seat will be moved forwardly. If the force applied to the inner frame, due to the inertia of the torso of the occupant 30 of the vehicle exceeds a predetermined force, which may be a force within the range of between 500 and 2,000 Newtons, the inner frame will pivot relative to the outer main frame 12 about the pivot axes defined by the pivotal connections 20,21. The inner frame, however, will now move freely, but will move against a resistive force provided by the force limiter 24.

The seat and the occupant of the seat will then move to the position illustrated in FIG. 7. It can be seen that the inner frame has moved rearwardly, the upper member 22 of the inner frame moving through a distance d4 so that the upper member 22 of the inner frame engages the upper member 15 of the main frame 12. In this particular example the movement of the upper part of the frame member through the distance d4 has caused the head of the occupant of the seat to move through a distance d3 to be brought into contact with the head-rest 16. The neck of the occupant of the vehicle now makes an angle α2 with the main torso of the occupant. The angle α2 is no greater than the angle 1 and is preferably less than the angle α1. When the seat is in the condition illustrated in FIG. 7, the entire back of the seat, that is to say the combination of the main frame 12 and the inner frame may then move pivotally about the pivot axis 17, to occupy the position shown in phantom. It is also appreciated, therefore, that the upper part of the seat back assembly will move rearwardly by a distance d5. This distance d5 may be about 100 mm.

The seat and occupant then have the condition illustrated in FIG. 8. The neck of the occupant still makes an angle α2 with the main torso of the occupant, meaning that this angle has not changed during the movement of the seat back assembly through the distance d5.

It is to be appreciated that as the main frame 12 pivots about the pivot axis 17, the movement through the distance d5 is effected against a retarding force provided by the force limiter 28. This retarding force may be in excess of 5,000 Newtons or even in excess of 10,000 Newtons. When the main frame 12 has pivoted through a predetermined distance, the abutment surface 26 present on the forwardly extending projection 25 may engage the stop 27, thus preventing further rearward movement.

The retarding force provided by the force limiter 28 is higher than the retarding force provided by the force limiter 24.

In FIGS. 2, 3 and 5 to 8 the force limiters 7,7', 24 and 28 have been illustrated in a totally schematic way. Different types of force limiter could be utilised. Some suitable force limiters will now be described by way of example.

Figure 9:
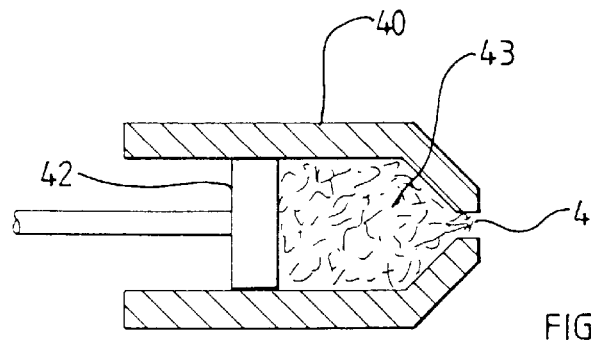
FIG. 9 is a sectional view of one type of force limiter that may be used on a seat as shown in FIGS. 5 to 8.

FIG. 9 illustrates one type of force limiter that can be used, comprising a cylinder 40 formed of an appropriate material which defines an outlet orifice 41. A piston 42 is present within the cylinder. The space between the piston and the outlet orifice 41 is filled with a deformable material. The deformable material may comprise lead or a plastic material. The cylinder 40 is fixed in position and the piston 42 is connected to the movable element. Thus, for example, the cylinder 40 may be connected to the outer frame, with the piston 42 being connected to the inner frame. Alternatively, the cylinder 40 may be connected to the side pieces 18, with the piston 42 being connected to the side element 14 of the main frame.

The arrangement is such that as the moveable element moves, this piston 42 is driven into the cylinder 40, thus ejecting the material 43 that is initially inside the cylinder through the outlet orifice 41. This provides a force limiting effect.

Figure 10:
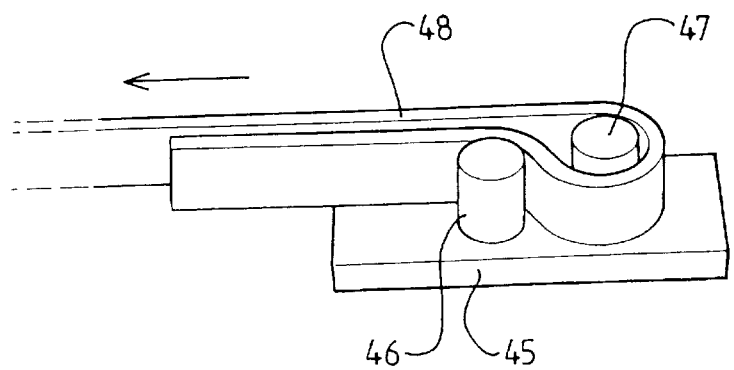
FIG. 10 is a perspective view of an alternative form of force limiter that might be used on the seat of FIGS. 5 to 8.
Figure 11:
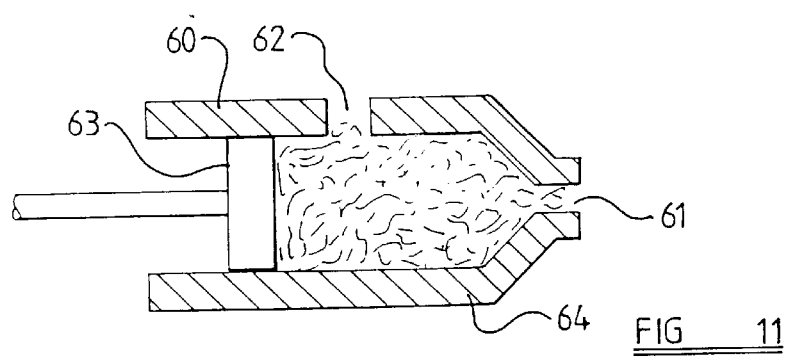
FIG. 11 is a sectional view of a force limiter adapted for use on the seat of FIGS. 2 or 3.

An alternative form of force limiter is shown in FIG. 10. A plate 45 is provided which supports two upwardly extending posts 45,47. A metal strip 48 is located to substantially surround one post 47, then to pass through the gap between the post 47 and 46, subsequently lying adjacent another part of the strip 48. If the free end 48 of the strip is pulled, the metal strip will slide through the posts 46 and 47, with the metal strip being deformed. This will absorb energy.

These types of force limiter are known in themselves and may be utilised in a seat of the type illustrated in FIGS. 5 to 8. However, alternate forms of force limiter may also be used.

Figure 12:
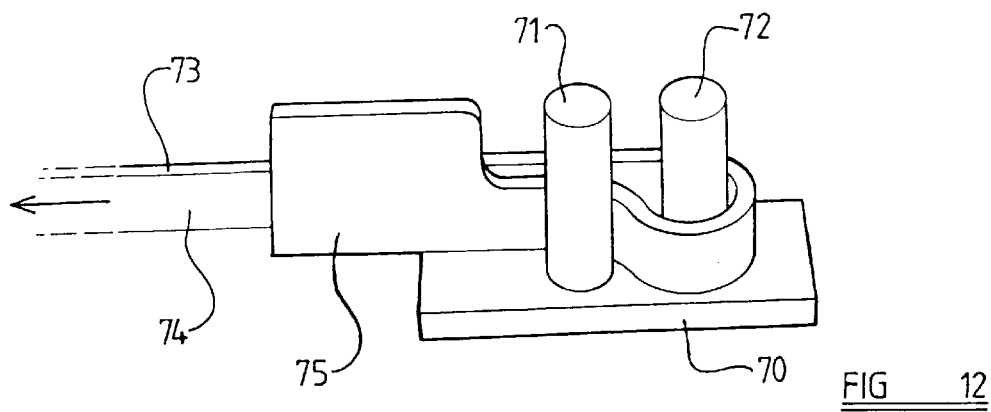
FIG. 12 is a view of an alternative form of force limiter for use on the seat of FIGS. 2 or 3.

FIG. 12 illustrates one example of a force limiter than could be used in the embodiment of FIGS. 2 or 3. In this embodiment, a cylinder 60 is provided defining an outlet orifice 61 at one end and a second outlet orifice 62 in the side of the cylinder. A piston 63 is provided which is inserted in the cylinder. The cylinder contains a deformable material 64 such as lead or a plastic material. The piston 63 would be connected to the back of the seat and the cylinder would be connected to the squab of the seat. As the back of the seat moves through the initial distance, the piston is driven into the cylinder, thus ejecting the deformable material through both the outlet ports 61 and 62. However, after a predetermined movement of the piston, which corresponds to the movement of the back of the seat through the distance d1, the piston moves past the outlet orifice 62, thus effectively closing that outlet orifice. A much greater force subsequently has to be applied to the piston to eject the deformable material 64 through the single available outlet orifice 61.

FIG. 12 illustrates a further force limiter that may be used in the embodiment of FIGS. 2 to 3. In this force limiter a plate 70 is provided with two upstanding posts 71,72 and a metal strip 73 is provided which is passed around the post 72, through the space between the post 72 and the post 71. One end portion 74 of the strip 73 is of a relatively low height, and tension is adapted to be applied to this end of the band. The other end portion 75 of the strip is of a greater height. As tension is applied to the metal strip 73, initially the first portion 74, of relatively low height is drawn past the upstanding posts. As the metal is deformed a predetermined force-limiting effect is experienced. This is equivalent to the movement of the seat back assembly through the distance d1, which is also equivalent to the movement of the inner frame through the distance d4. Subsequently, however, the portion of the band of greater height 75 passes between the posts 72 and 71, and a greater force-limiting effect is experienced, since a greater width of metal must be deformed as the band passes between the posts 71,72 and subsequently around the post 72. This is equivalent to the movement of the back of the seat back assembly through the distance d2, which is also equivalent to the movement of the upper part of the main frame 12 through the distance d5.

It is to be appreciated, from the foregoing description, that in preferred embodiments of the invention, in the event that a rear accident arises, the back of the seat may move through a first predetermined distance, with the movement being subjected to a force-limiting effect providing relatively low resistance, and subsequently the back of the seat may move through a further distance, whilst being subjected to a force-limiting effect providing a relatively high resistance.

It is believed that this movement of the back of the seat may serve to minimize whiplash injuries.

What is claimed is:

1. A vehicle seat, comprising:

a squab;

a back connected to the squab, at least a substantial part of the back of the seat being arranged to undergo a rearward movement relative to an initial position of the squab of the seat, the rearward movement comprising at least one of a pivoting movement, a sliding movement, and a bending movement; and a force limiter presenting a first, relatively low level resisting force to the rearward movement as a first predetermined amount of the movement, and a second, relatively high level resisting force at a second predetermined amount of the movement.

2. A vehicle seat according to claim 1 further comprising: a stop means terminating said rearward movement of the back of the seat relative to the squab after a predetermined extent of the movement.

3. A vehicle seat according to claim 1, further comprising: a catch arranged to prevent the rearward movement of the substantial part of the back of the seat, and means for releasing the catch in response to a sensed rear impact.

4. A vehicle seat according to claim 1 wherein the said substantial part of the back of the seat is pivotally connected to the squab of the seat.

5. A vehicle seat according to claim 1 wherein the entire back of the seat is adapted to move relative to the squab of the seat.

6. A vehicle seat according to claim 1, wherein the back of the seat further includes a top and the first predetermined amount of movement causes a movement, measured at the top of the back of the seat, through a distance in a range of 150–250 mm.

7. A vehicle seat according to claim 1, wherein the back of the seat further includes a top and a the second predetermined amount of movement causes a movement, measured at the top of the back of the seat, of less than 80 mm.

8. A vehicle seat according to claim 1, wherein said first, relatively low level resisting force will be overcome by a force of less than 2,000 Newton's applied to the center of the back of the seat.

9. A vehicle seat according to claim 1 wherein said second, relatively high level resisting force will be overcome only by a force in excess of 5,000 Newtons applied to the center of the back of the seat.

10. A vehicle seat according to claim 1 wherein said second, relatively high level resisting force will be overcome only by a force in excess of 10,000 Newtons applied to the center of the back of the seat.

11. A vehicle seat according to claim 1, wherein the substantial part of the back of the seat is slideably connected to the squab of the seat to permit a sliding movement of the substantial part of the back of the seat relative to the squab of the seat.

12. A vehicle seat according to claim 1, wherein the substantial part of the back of the seat is connected to the squab of the seat by a mechanism which permits the substantial part of the back of the seat to move rearwardly relative to the squab of the seat with a pivoting movement and which also permits a substantial part of the back of the seat to move rearwardly with a sliding movement.

13. A vehicle seat according to claim 1, wherein the substantial part of the back of the seat moves rearwardly against the first, relatively low resisting force, during the first predetermined amount of movement, while another part of the back of the seat, including a headrest, remains substantially still, and both the said substantial part of the back of the seat and the said another part of the back of the seat move rearwardly against the second, relatively high resisting force.

* * * * *